United States Patent
Standley et al.

(10) Patent No.: US 11,434,940 B2
(45) Date of Patent: Sep. 6, 2022

(54) ROTARY ACTUATOR

(71) Applicant: The Boeing Company, Chicago, IL (US)

(72) Inventors: John A. Standley, Seattle, WA (US); Kim R. Lisenko, Lynnwood, WA (US); Timothy Paul Zazynski, Marysville, WA (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 16/799,759

(22) Filed: Feb. 24, 2020

(65) Prior Publication Data
US 2021/0262495 A1    Aug. 26, 2021

(51) Int. Cl.
| | |
|---|---|
| F15B 15/12 | (2006.01) |
| B64C 13/32 | (2006.01) |
| B64C 13/40 | (2006.01) |
| F01C 9/00 | (2006.01) |
| B64C 13/30 | (2006.01) |
| B64C 9/00 | (2006.01) |

(52) U.S. Cl.
CPC ............ *F15B 15/125* (2013.01); *B64C 13/32* (2013.01); *B64C 13/40* (2013.01); *F01C 9/002* (2013.01); *B64C 13/30* (2013.01); *B64C 2009/005* (2013.01)

(58) Field of Classification Search
CPC ....... F15B 15/125; B64C 13/40; B64C 13/32; F01C 9/002
See application file for complete search history.

(56) References Cited

U.S. PATENT DOCUMENTS 3,938,480 A * 2/1976 Yanda ..................... F01B 13/04
                                              123/43 B
4,962,902 A    10/1990 Fortes
                (Continued)

FOREIGN PATENT DOCUMENTS

EP    0098614 A2    1/1984
EP    0098614 A3    1/1984
                (Continued)

OTHER PUBLICATIONS

European Patent Office, Extended European Search Report regarding European Patent Application No. 21158938.7, dated Jul. 16, 2021, 11 pages.

*Primary Examiner* — Abiy Teka
(74) *Attorney, Agent, or Firm* — Kolisch Hartwell, P.C.

(57) ABSTRACT

A rotary actuator, including a manifold block and a rotor assembly that includes a rotor shaft and a plurality of arcuate pistons attached to the rotor shaft, each arcuate piston curving at a set radial distance from the rotor shaft, and each piston attached to the rotor shaft via a crank arm. A pressure chamber assembly coupled to the manifold block defines a plurality of piston pressure chambers that receive and at least partially enclose each arcuate piston, including a plurality of gland seals disposed adjacent the entrance of each piston pressure chamber to create a seal between the inner surface of the pressure chamber and the outer surface of the arcuate piston. Each gland seal includes an inner seal that engages the piston surface of the arcuate piston, and plural outer seals that engage the inner surface of the piston pressure chamber, forming a hydraulic seal.

21 Claims, 13 Drawing Sheets

(56) References Cited

U.S. PATENT DOCUMENTS

| | | | |
|---|---|---|---|
| 5,044,257 A | 9/1991 | Scobie | |
| 5,054,374 A | 10/1991 | Scobie et al. | |
| 8,684,316 B2* | 4/2014 | Sakurai | B64C 9/16 |
| | | | 244/216 |
| 9,133,923 B2 | 9/2015 | Ito et al. | |
| 9,593,696 B2 | 3/2017 | Kim et al. | |
| 9,631,645 B2 | 4/2017 | Sobolewski et al. | |
| 9,816,537 B2* | 11/2017 | Kim | F15B 15/125 |
| 9,950,782 B2 | 4/2018 | Huynh et al. | |
| 2013/0104729 A1* | 5/2013 | Ito | F01C 1/063 |
| | | | 92/32 |

FOREIGN PATENT DOCUMENTS

| | | | |
|---|---|---|---|
| EP | 2644823 A2 | 10/2013 | |
| EP | 2644823 A3 | 6/2015 | |

\* cited by examiner

ROTARY ACTUATOR

FIELD

This disclosure relates to rotary actuators. More specifically, the disclosure relates to rotary actuators used to controllably position flight control surfaces of aircraft.

INTRODUCTION

Aircraft in flight are controlled by manipulation of the flight control surfaces of the aircraft including main flight control surfaces such as ailerons, elevators, and rudders, and secondary flight control surfaces such as spoilers, flaps, slat, and air brakes. Actuation of flight control surfaces permit the pilot to control the pitch, yaw, roll, and lift of the aircraft, among other flight characteristics.

Movement of a flight control surface is typically effected via one or more linear actuators, which are generally positioned approximately perpendicular to the pivoting axis of the coupled control surface, and connected to the control surface by an articulated linkage. This positioning often requires the linear actuator to be installed within a rudder, elevator, or wing.

In pursuit of greater efficiency and enhanced flight performance, aircraft wings have become thinner over time. In particular, the distance between the top and bottom of the outer mold line (OML) at a typical control surface pivot axis has become significantly smaller. When a conventional piston-like linear actuator is installed within such a thin wing, the actuator or articulated linkage may partially project beyond the surface of the wing, increasing drag and decreasing fuel efficiency even if enclosed by a bubble or blister.

Ailerons, in particular, are positioned along the trailing edge of the wing, where only minimal internal space is available for a coupled actuator. For that reason, there has been a demand to employ rotary hydraulic actuators, with their smaller footprint volume, for such applications. Unfortunately, previous rotary hydraulic actuators have not been capable of sustained operation without hydraulic leaks, potentially affecting accurate positioning of the associated aileron as well as creating numerous maintenance issues.

SUMMARY

The present disclosure provides rotary actuators, control surface actuator systems including rotary actuators, and methods of actuating aircraft control surfaces using rotary actuators.

In some examples, the present disclosure relates to rotary actuators that include a manifold block and a first rotor assembly mounted to the manifold block. The first rotor assembly in turn includes a first rotor shaft extending into the manifold block; a plurality of arcuate pistons attached to the rotor shaft, each arcuate piston curving at a set radial distance from a rotation axis of the rotor shaft, and each piston attached to the rotor shaft via a crank arm; a first pressure chamber assembly coupled to the manifold block, the first pressure chamber defining a plurality of piston pressure chambers configured to receive and at least partially enclose each arcuate piston; and a plurality of gland seals disposed adjacent an entrance to each piston pressure chamber and creating a seal between an inner surface of the piston pressure chamber and an outer surface of the arcuate piston inserted therein, where each gland seal includes an inner seal configured to engage a surface of the arcuate piston, and a plurality of outer seals configured to engage the inner surface of the piston pressure chamber, so that a hydraulic seal is formed between each piston pressure chamber and the arcuate piston inserted therein. The first rotor assembly is configured so that delivering a hydraulic fluid to the plurality of piston pressure chambers causes the arcuate piston disposed within each piston pressure chamber to translate at the set radial distance around the rotation axis of the first rotor shaft, and thereby rotates the first rotor shaft.

In some examples, the present disclosure relates to a control surface actuator system that includes a control surface of an aircraft, a rotary actuator that is coupled to the control surface, so that operation of the rotary actuator actuates a movement of the control surface. The rotary actuator can includes a manifold block, and a first and a second rotor assembly mounted to opposing sides of the manifold block along a rotation axis. Each of the first and second rotor assemblies, in turn, includes a rotor shaft extending into the manifold block along the rotation axis; a plurality of arcuate pistons attached to the rotor shaft, each piston curving along a defined radial distance from a rotation axis of the rotor shaft, and each piston attached to the rotor shaft via an intermediate crank arm; a pressure chamber assembly coupled to the manifold block, the pressure chamber defining a plurality of piston pressure chambers configured to receive and at least partially enclose the plurality of arcuate pistons; and a plurality of gland seals disposed adjacent an entrance to each piston pressure chamber and creating a seal between an inner surface of the piston pressure chamber and the arcuate piston disposed therein. Each gland seal includes an inner seal configured to engage the arcuate piston, and a plurality of outer seals configured to engage the inner surface of the piston pressure chamber, so that a hydraulic seal is formed between each piston pressure chamber and the arcuate piston inserted therein. Each rotor assembly is configured so that delivering hydraulic fluid to the plurality of piston pressure chambers causes the arcuate piston disposed within each piston pressure chamber to translate around the rotation axis, increasing a piston pressure chamber volume and thereby rotating the coupled rotor shaft.

In some examples, the present disclosure relates to a method of actuating an aircraft control surface. The method can include providing a rotary actuator, where the rotary actuator includes a manifold block, and a first rotor assembly mounted to the manifold block. The first rotor assembly can include a first rotor shaft extending into the manifold block; a plurality of arcuate pistons attached to the rotor shaft, each piston curving along a defined radial distance from a rotation axis of the rotor shaft, and each piston attached to the rotor shaft via an intermediate crank arm; a first pressure chamber assembly coupled to the manifold block, the first pressure chamber defining a plurality of piston pressure chambers configured to receive and at least partially enclose the plurality of arcuate pistons; where the manifold block defines a plurality of internal channels to deliver hydraulic fluid to the piston pressure chambers; and a plurality of gland seals disposed adjacent an entrance to each piston pressure chamber and creating a seal between an inner surface of the piston pressure chamber and the arcuate piston disposed therein. Each gland seal can include an inner seal configured to engage a surface of the arcuate piston, and a plurality of outer seals configured to engage the inner surface of the piston pressure chamber, so that a hydraulic seal is formed between each piston pressure chamber and the arcuate piston inserted therein. The first rotor assembly is configured so that delivering hydraulic fluid to the plurality of piston pressure chambers via the plurality of internal channels of the manifold block causes the arcuate piston disposed within each piston pressure chamber to translate around the rotation axis of the first rotor shaft, thereby rotating the first rotor shaft. An inner end of the first rotor shaft extends into a recess formed in the manifold block, with an output lug coupling the inner end of the first rotor shaft to the aircraft control surface. The method can further include delivering pressurized hydraulic fluid to the first pressure chamber assembly via the internal channels of the manifold block to increase hydraulic fluid pressure within the piston pressure chambers of the first pressure chamber assembly; rotating the first rotor shaft by urging the arcuate pistons disposed within the piston pressure chambers of the first pressure chamber assembly to translate around the rotation axis of the first rotor shaft due to the increased hydraulic fluid pressure within the piston pressure chambers; moving the output lug coupled to the inner end of the first rotor shaft by rotating the first rotor shaft; and actuating the aircraft control surface by moving the output lug.

Features, functions, and advantages can be achieved independently in various examples of the present disclosure, or can be combined in yet other examples, further details of which can be seen with reference to the following description and drawings.

DETAILED DESCRIPTION

Various aspects and examples of rotary actuators, control surface actuation systems, and methods of actuating an aircraft control surface are described below and illustrated in the associated drawings. Unless otherwise specified, the rotary actuators, systems, and methods, their individual steps and variations may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

Overview

Figure 1:
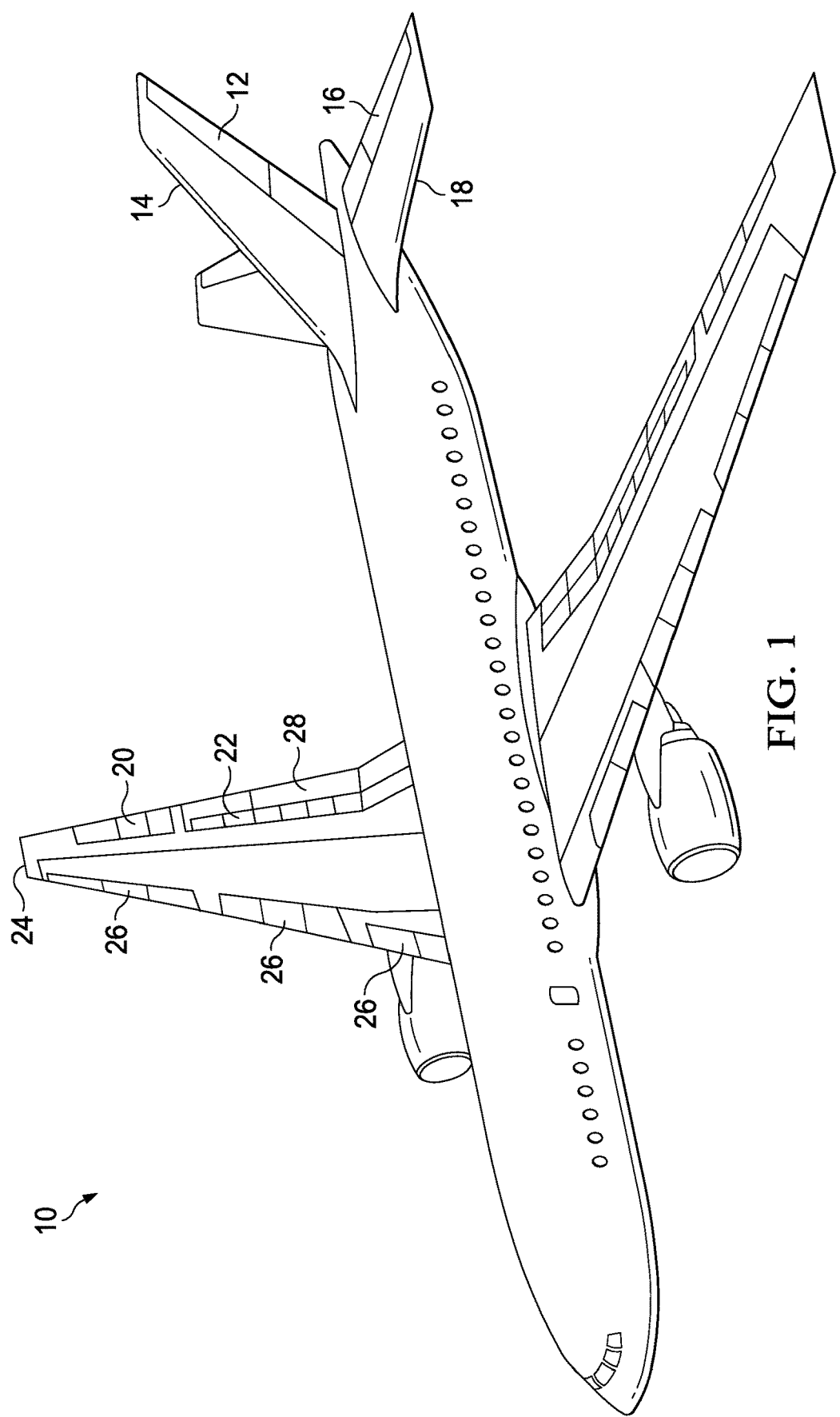
FIG. 1 is a schematic of an aircraft that identifies selected control surfaces of the aircraft.

An aircraft 10 is shown in FIG. 1 including the identification of selected main and secondary flight control surfaces of the aircraft. Aircraft flight control surfaces can include rudders 12 on a vertical stabilizer 14, elevators 16 on horizontal stabilizer 18, ailerons 20 and spoilers 22 on wings 24, and slats 26 and flaps 28 also on wings 24.

Figure 2:
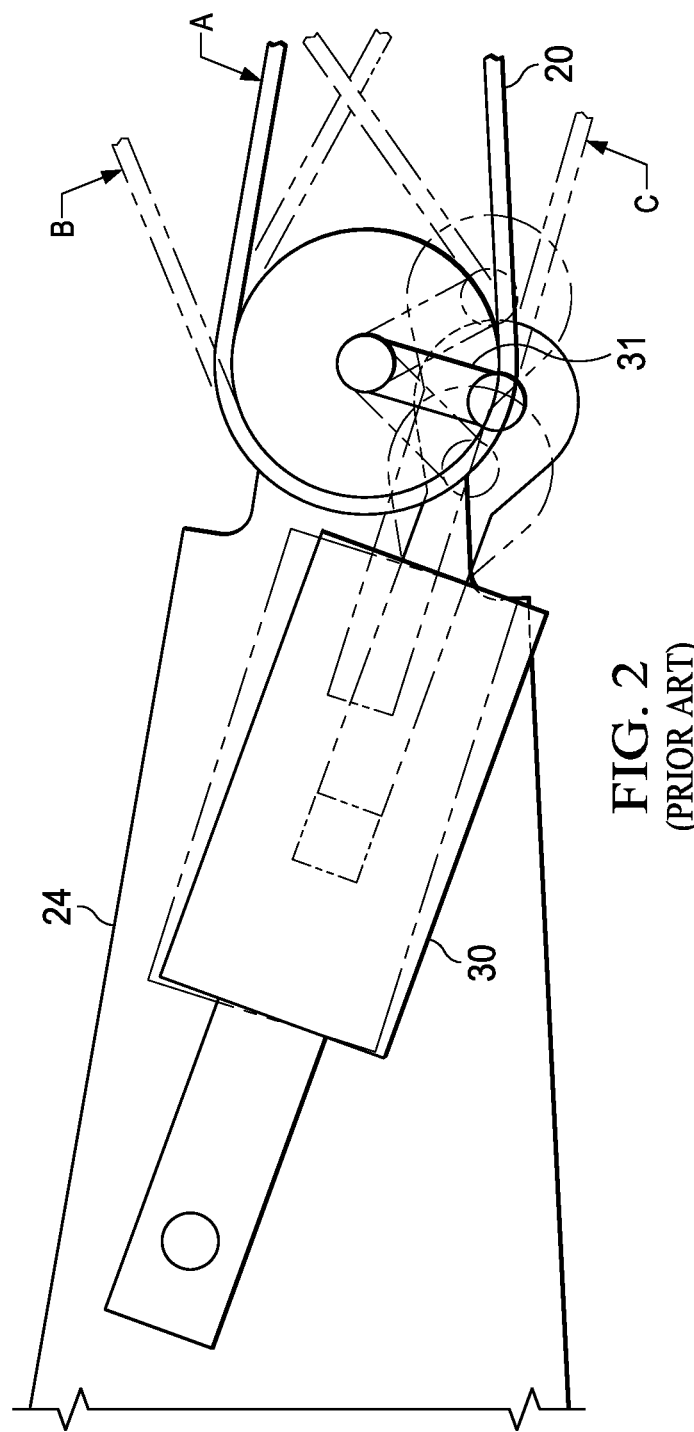
FIG. 2 is a schematic cross-section illustrating a conventional linear actuator coupled to a control surface at the trailing edge of a wing.

FIG. 2 is a partial cross-section of an aileron control surface 20 in combination with a wing 24, where aileron 20 is coupled to a conventional linear actuator 30. As shown, actuation of aileron 20 requires extension of linear actuator 30. Due to the relatively thin cross-section of wing 24, even in a neutral position (A) linear actuator 30 extends beyond the envelope of wing 24, and then protrudes even further upon actuation (B). Even when fully retracted, the actuator coupling 31 between linear actuator 30 and aileron 20 extends beyond the skin of wing 24 (C).

Figure 3:
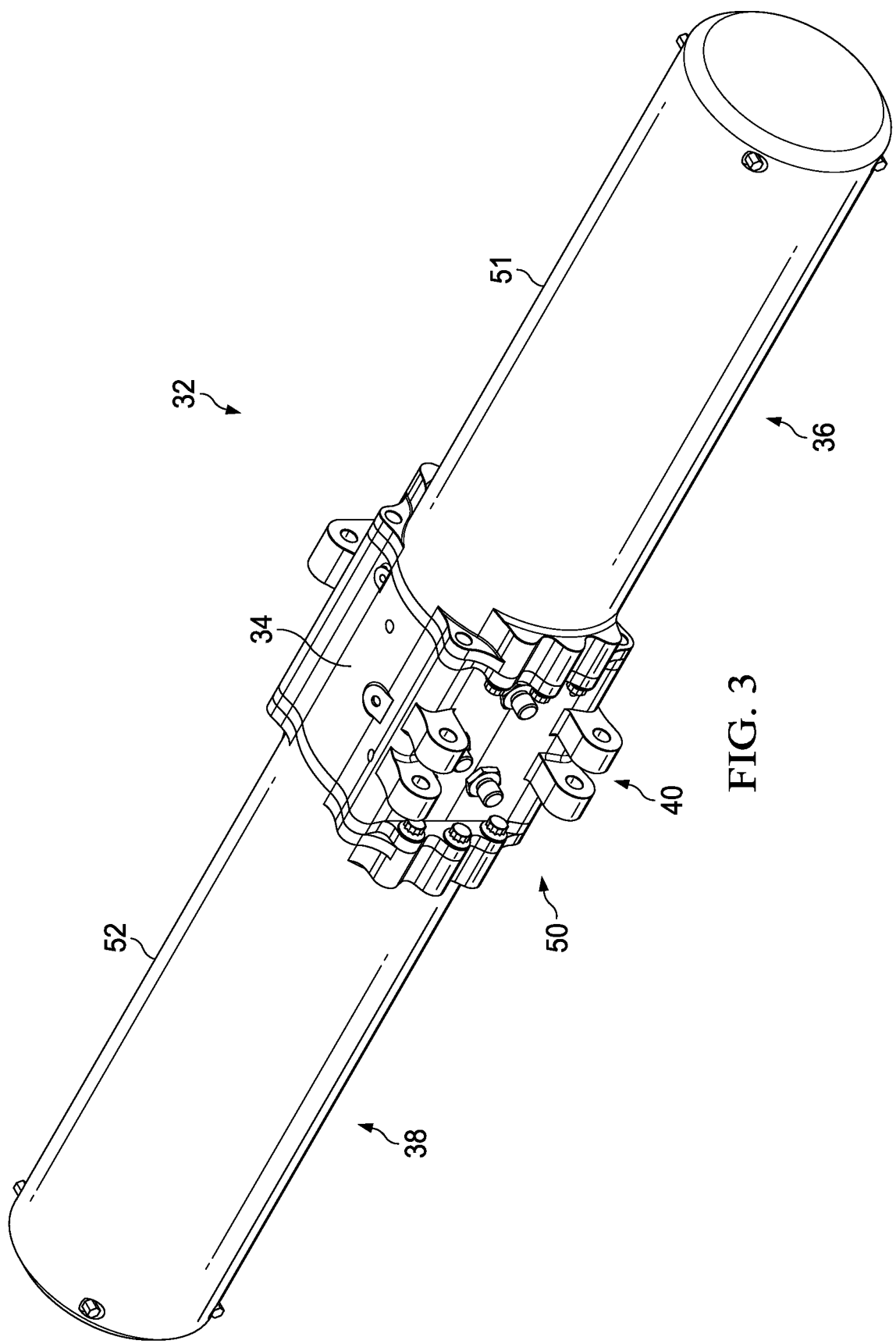
FIG. 3 depicts an illustrative rotary actuator according to the present disclosure.
Figure 4:
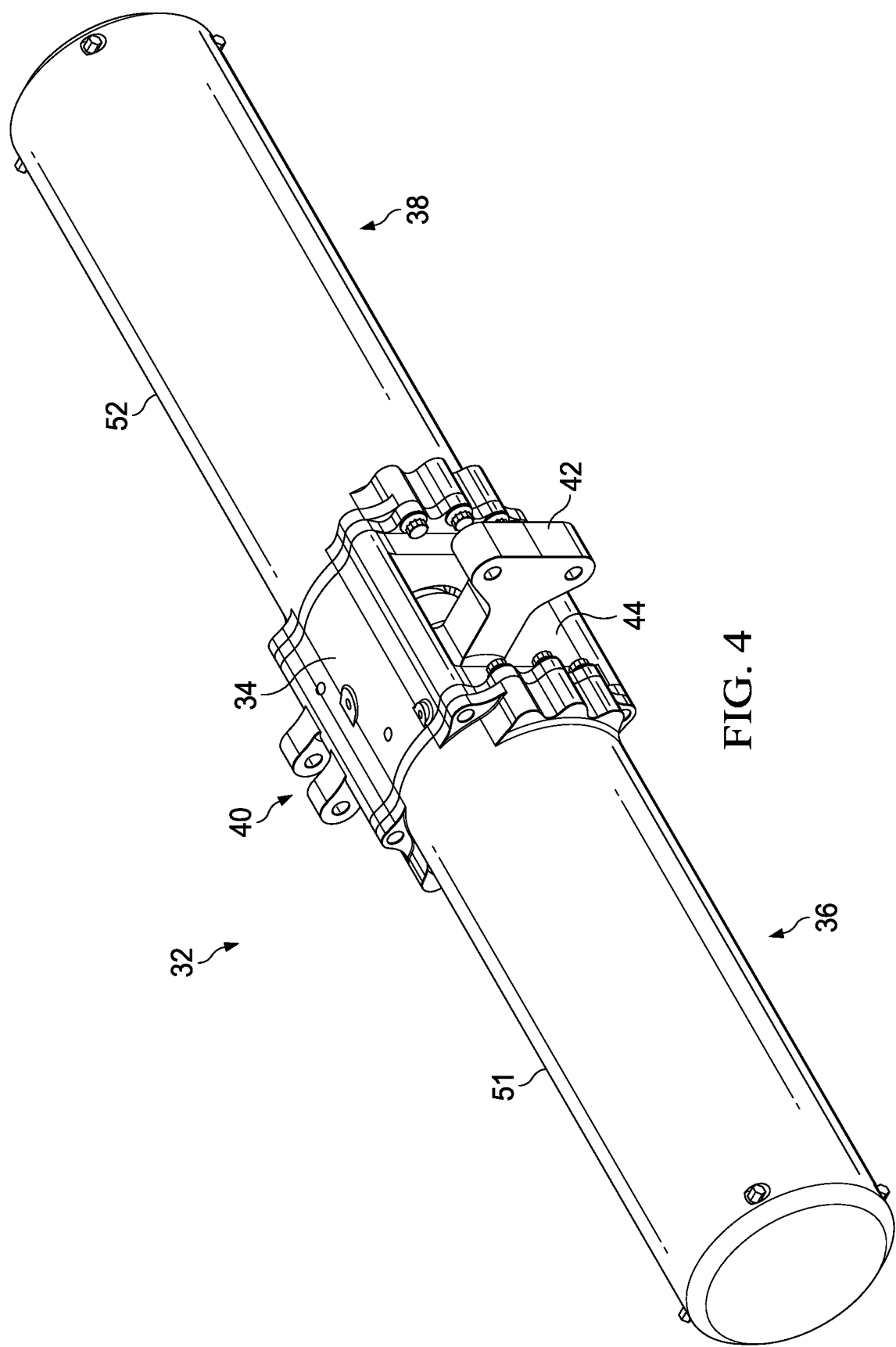
FIG. 4 depicts the illustrative rotary actuator of FIG. 3.
Figure 5:
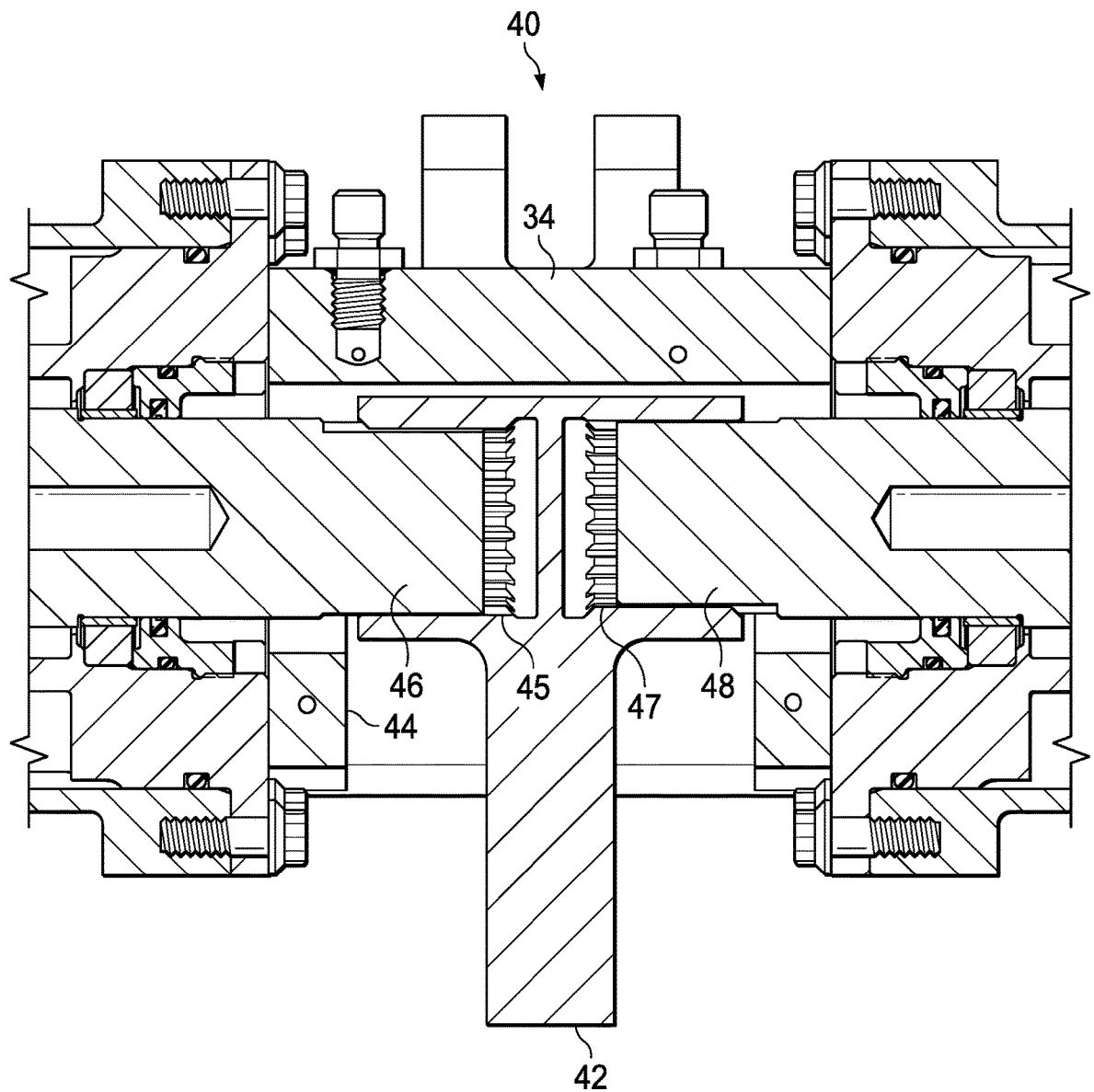
FIG. 5 is a cross-sectional view of a manifold block of the rotary actuator of FIG. 3.

An illustrative rotary actuator 32 that has been configured to minimize the space requirements for control surface actuators is shown in FIGS. 3 and 4. Rotary actuator 32 includes a manifold block 34, a first rotor assembly 36 and a second rotor assembly 38. The first and second rotor assemblies are each mounted to manifold block 34 on opposing sides of manifold block 34. As shown particularly in FIG. 3, manifold block 34 includes a mounting bracket 40 for attaching rotary actuator 32, via manifold block 34, within and to aircraft 10. Rotary actuator 32 further includes an output lug 42 that extends from a recess 44 formed in manifold block 34, as shown in FIG. 4. Although output lug 42 extends from recess 44 in manifold block 34, output lug 42 is not attached to manifold block 34, but is directly coupled to both an inner end 45 of a first rotor shaft 46 extending from first rotor assembly 36, and an inner end 47 of a second rotor shaft 48 extending from second rotor assembly 38, as shown in FIG. 5. Output lug 42 is further configured to be coupled to an actuator arm that is, in turn, coupled to a control surface, so that operation of rotary actuator 32 will actuate movement of that control surface.

Manifold block 34 can additionally include a hydraulic interface 50, which can include a plurality of connection ports to facilitate the connection of the hydraulics of rotary actuator 32 to the hydraulic systems of aircraft 10.

First rotor assembly 36 and second rotor assembly 38 can include a first actuator housing 51 and a second actuator housing 52, respectively. The actuator housings are sealingly coupled to manifold block 34 on opposing sides of the manifold block, and each actuator housing encloses the remaining components of respective first and second rotor assemblies, as will be discussed below with particular respect to the components of first rotor assembly 36.

Figure 6:
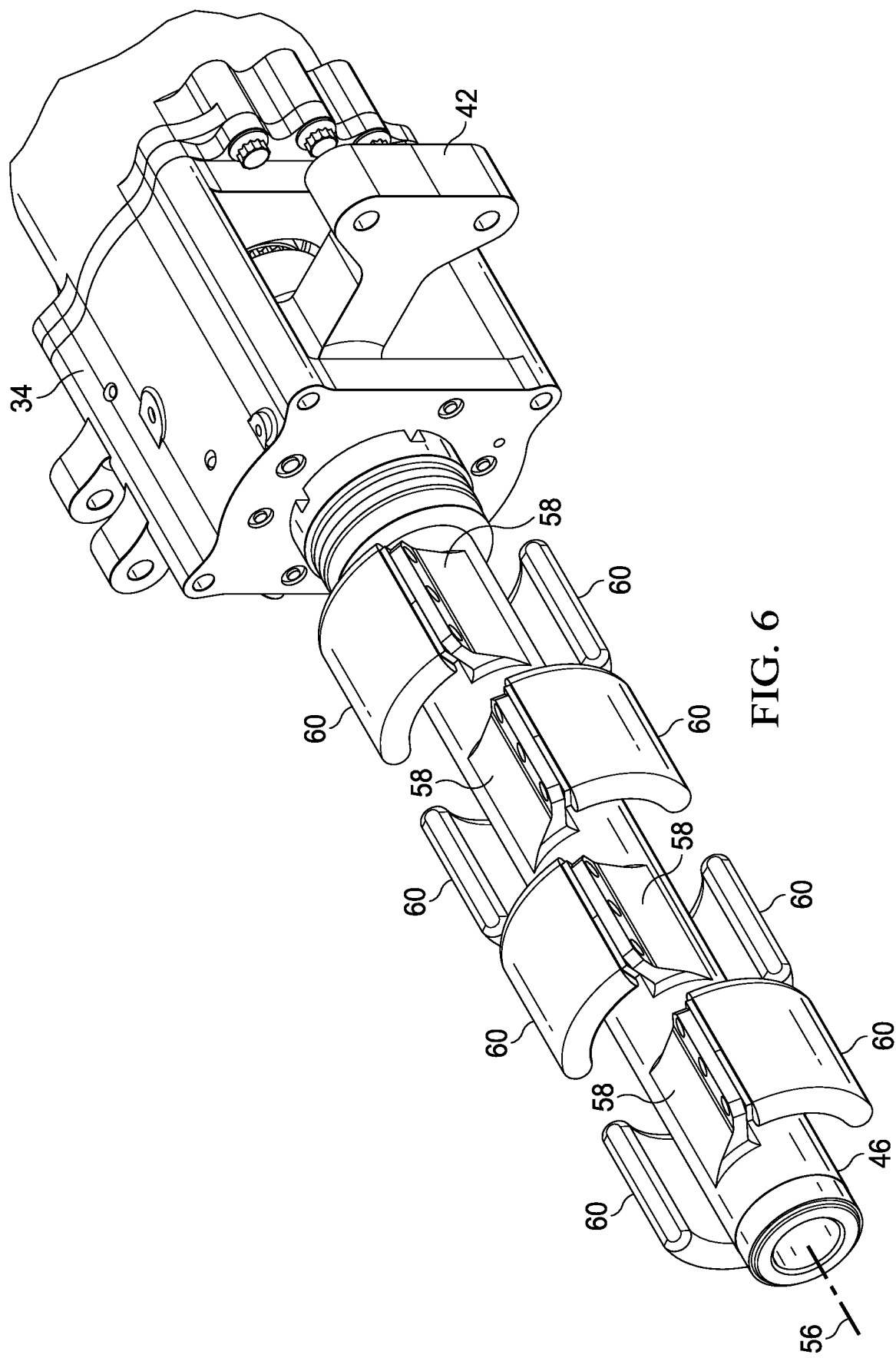
FIG. 6 depicts the rotor shaft, crank arms, and arcuate pistons of a first rotor assembly of the illustrative rotary actuator of FIG. 3.
Figure 8:
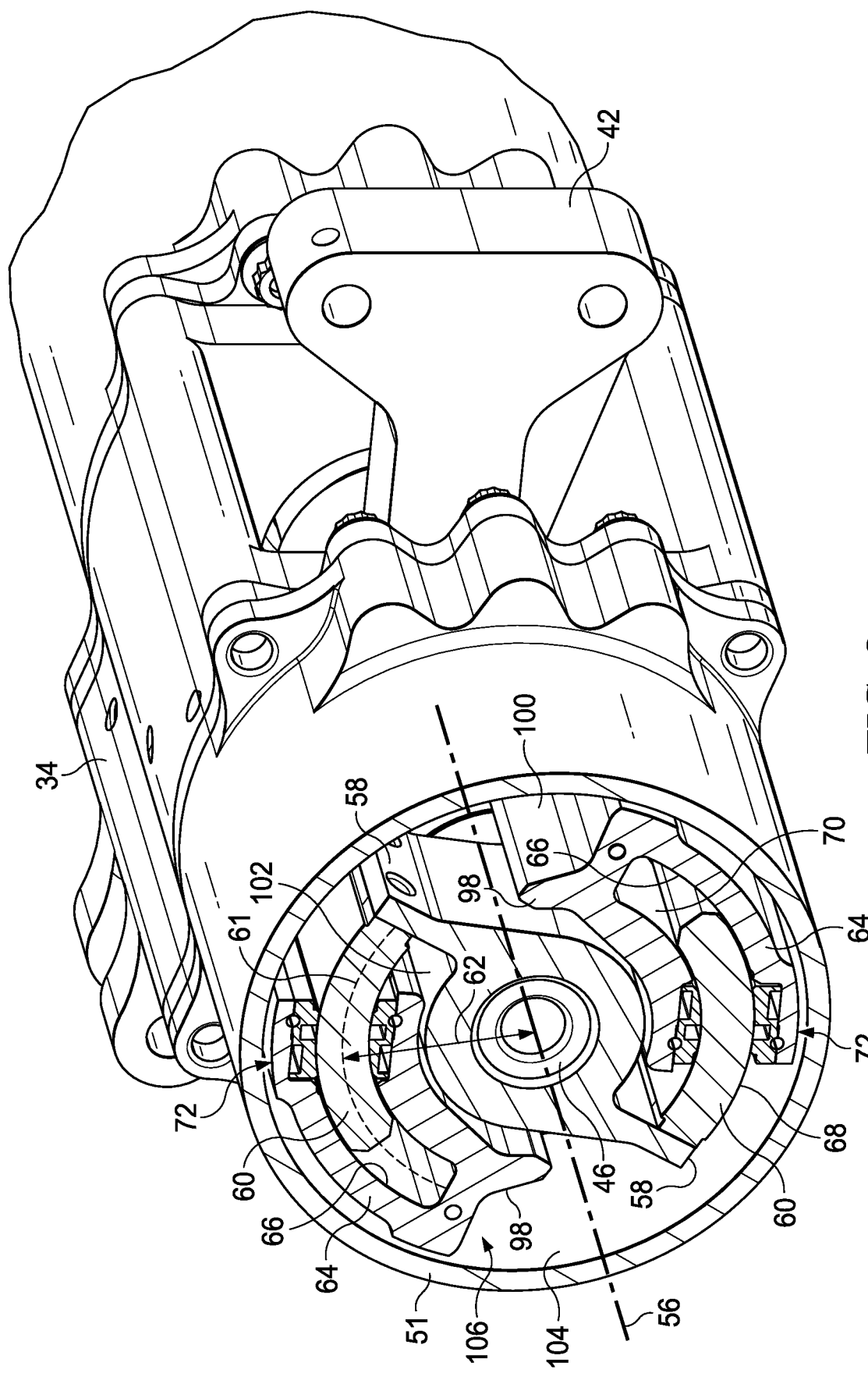
FIG. 8 depicts a cutaway view of the first rotor assembly of the rotary actuator of FIG. 3, in a plane orthogonal to the rotation axis of the rotor shaft.

As shown in FIG. 6, first rotor assembly 36 can include a first rotor shaft 46 that extends the length of the first rotor assembly 36 and into manifold block 34, and defines a rotation axis 56 within first actuator housing 51. A plurality of crank arms 58 can be attached to first rotor shaft 46, where each crank arm couples first rotor shaft 46 to an arcuate piston 60. Each arcuate piston 60 is shaped so as to extend along a curve 61 at a set radial distance 62 from rotation axis 56 of first rotor shaft 46, where set radial distance 62 is the same for each arcuate piston 60 (as shown in FIG. 8).

Each of arcuate pistons 60 can be configured so as to have an elongate cross-section, with rounded edges, and a rounded distal surface opposite the end of arcuate piston 60 that is attached to crank arm 58. The particular shape of the arcuate pistons is not critical, provided that they are accurately and smoothly machined to a close tolerance, and they follow a curve 61 having the set radial distance 62. For example, arcuate pistons 60 can have a circular cross-section (having the form of arcuate rods), or arcuate pistons 60 can have a square or rectangular cross-section without departing from the scope and spirit of the present disclosure.

Figure 7:
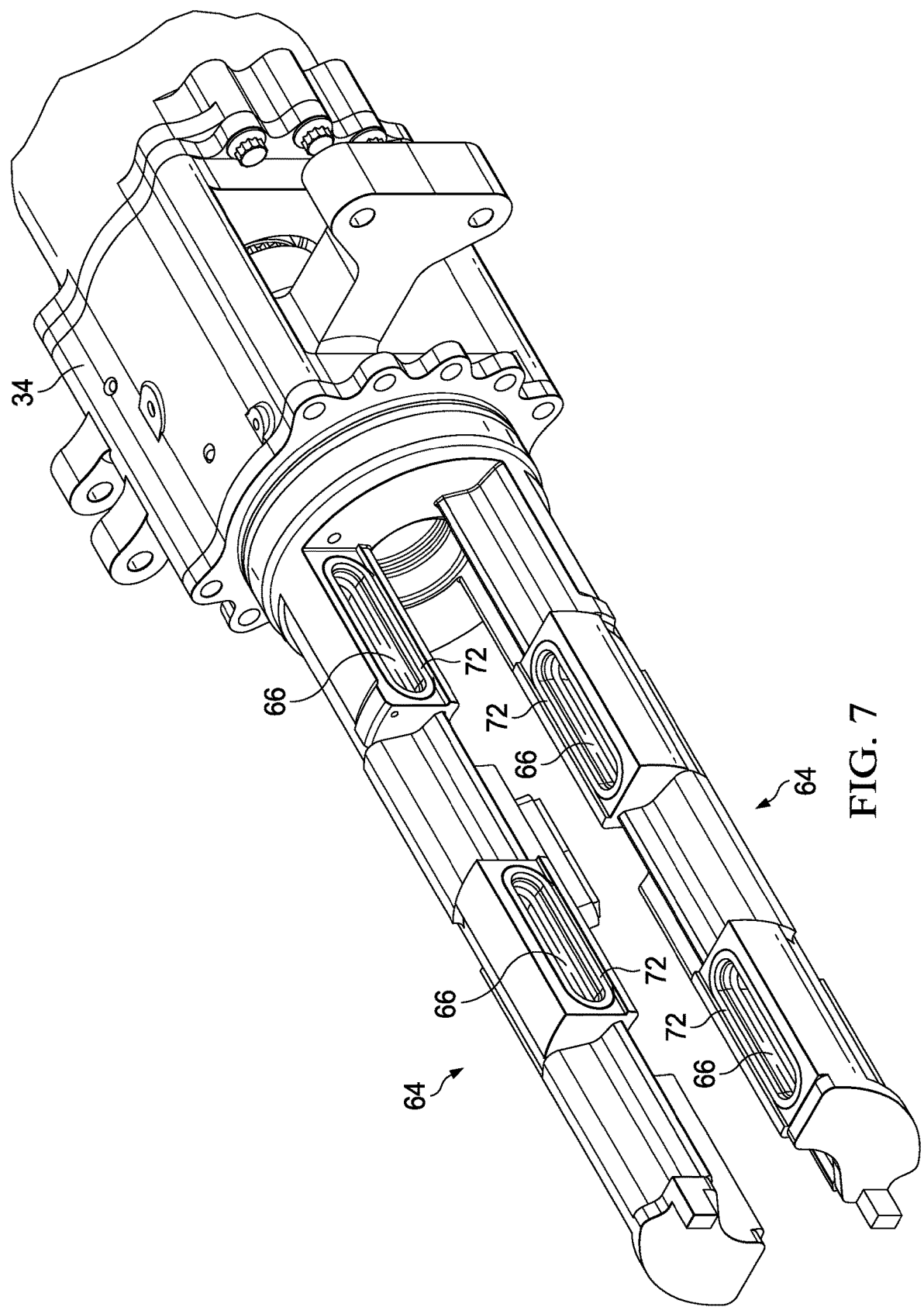
FIG. 7 depicts the pressure chamber assembly of the first rotor assembly of the illustrative rotary actuator of FIG. 3.

As shown in FIG. 7, first rotor assembly 36 can include one or more first pressure chamber assemblies 64 coupled to and extending from manifold block 34. Each first pressure chamber assembly 64 defines a plurality of piston pressure chambers 66, where each piston pressure chamber 66 is configured to receive and at least partially enclose an arcuate piston 60, as shown in FIG. 8. First rotor assembly 36 can be configured to include a piston pressure chamber 66 corresponding to each arcuate piston 60 in first rotor assembly 36.

Arcuate pistons 60 and piston pressure chambers 66 can be manufactured to a close tolerance, such that each arcuate piston 60 is free to move along the set radial distance 62 from rotation axis 56 within corresponding piston pressure chamber 66 with minimal or no contact between an outer surface 68 of arcuate piston 60 and an interior surface 70 of piston pressure chamber 66. In addition to eliminating destructive wear on the components of first rotor assembly 36, such close tolerances can help to improve the hydraulic operation of the resulting rotary actuator.

Figure 9:
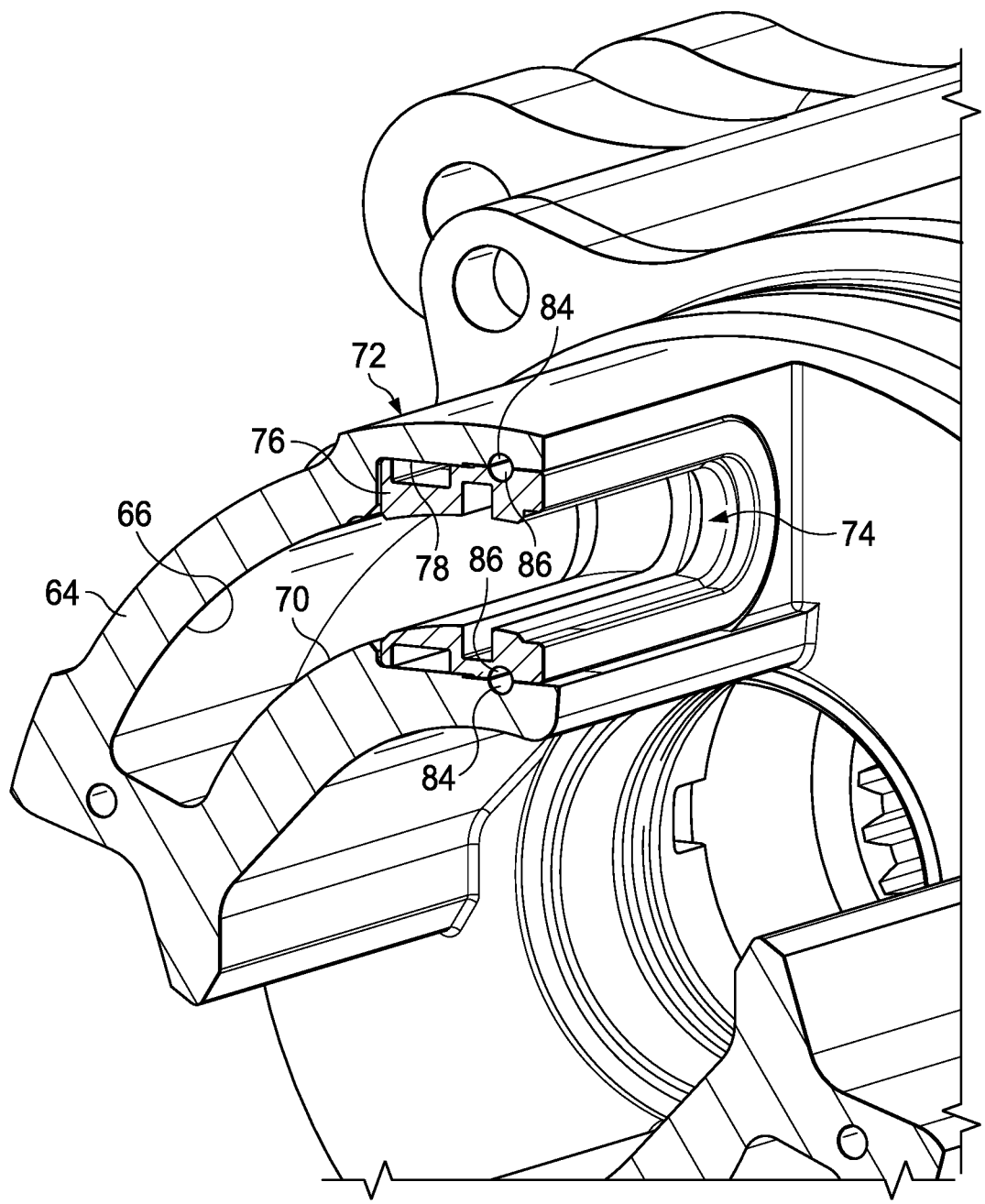
FIG. 9 depicts a cutaway view of a piston pressure chamber of the first rotor assembly of the rotary actuator of FIG. 3.

Although arcuate pistons 60 and piston pressure chambers 66 may not make actual physical contact as arcuate piston 60 moves within the piston pressure chamber, the piston pressure chamber is nonetheless hydraulically sealed by the interposition of a gland seal assembly 72 between the outer surface 68 of arcuate piston 60 and the inner surface 70 of piston pressure chamber 66. The components of gland seal 68 are shown in greater detail in FIGS. 9 and 10.

Figure 10:
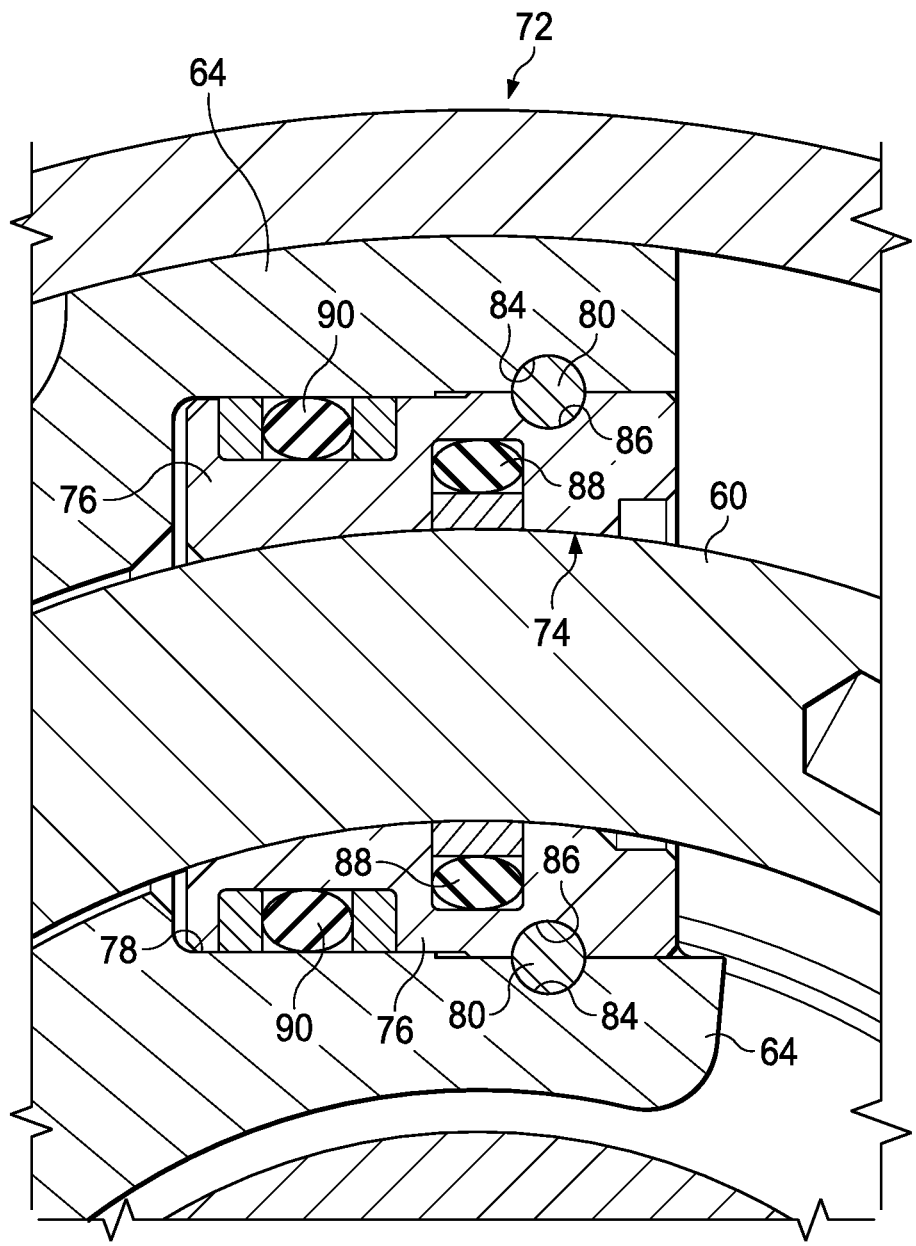
FIG. 10 is a cross-sectional view of a gland seal of a piston pressure chamber of the rotary actuator of FIG. 3.

Each gland seal assembly 72 is disposed adjacent to an entrance 74 of the piston pressure chamber 66, such that gland seal assembly 72 can create a hydraulic seal between inner surface 70 of piston pressure chamber 66 and outer surface 68 of arcuate piston 60 when it is at least partially inserted into its corresponding piston pressure chamber 66. Each gland seal assembly 72 can include a gland 76 that is seated within a gland bore 78 formed in inner surface 70 of piston pressure chamber 66. Gland bore 78 is typically formed around the circumference of inner surface 70, such that when gland seal assembly 72 is seated in gland bore 78, gland seal assembly 72 surrounds arcuate piston 60 when piston 60 is inserted at least partially into piston pressure chamber 66. Gland 76 can be retained within gland bore 78 by the presence of a shear wire 80 that is disposed between an inner wall 82 of gland bore 78 and gland 76. While sandwiched therebetween, shear wire 80 simultaneously rests in a complementary groove 84 formed in inner wall 82 and a complementary groove 86 formed in gland 76, as shown in FIG. 10. In this way, the interaction of shear wire 80 with grooves 84 and 86 ensures that gland 76 is securely retained in place even as arcuate piston 60 is repeatedly urged reciprocally in and out of piston pressure chamber 66.

Although gland 76 can help facilitate the formation of the necessary hydraulic seal between pressure chamber inner surface 70 and piston outer surface 68, each gland seal can additionally include one or more additional inner gland seals 88 configured to engage surface 68 of arcuate piston 60, and to create a seal between arcuate piston 60 and gland 76. Inner gland seal 88 is typically a rod seal. Gland 76 can additionally include a plurality of outer gland seals 90 positioned to engage inner surface 82 of gland bore 78 and configured to create a seal between inner surface 82 and gland 76. Outer gland seals 90 can include a plurality of O-ring seals. The construction of gland seal assembly 72, with its multiplicity of sealing elements, provides a robust hydraulic seal that is sufficient to not only operate rotary actuator 32 hydraulically, but to prevent hydraulic fluid leaks even after repeated operation of the rotary actuator, leaks that have been at least partially responsible for the unsuitability of previous rotary actuator mechanisms. The design of gland seal assembly 72 further permits an incremental degree of additional float of the gland assembly relative to gland bore 78 of pressure chamber assembly 64, and the rotary actuator is therefore better able to tolerate dimensional deviations falling within manufacturing tolerances.

Figure 11:
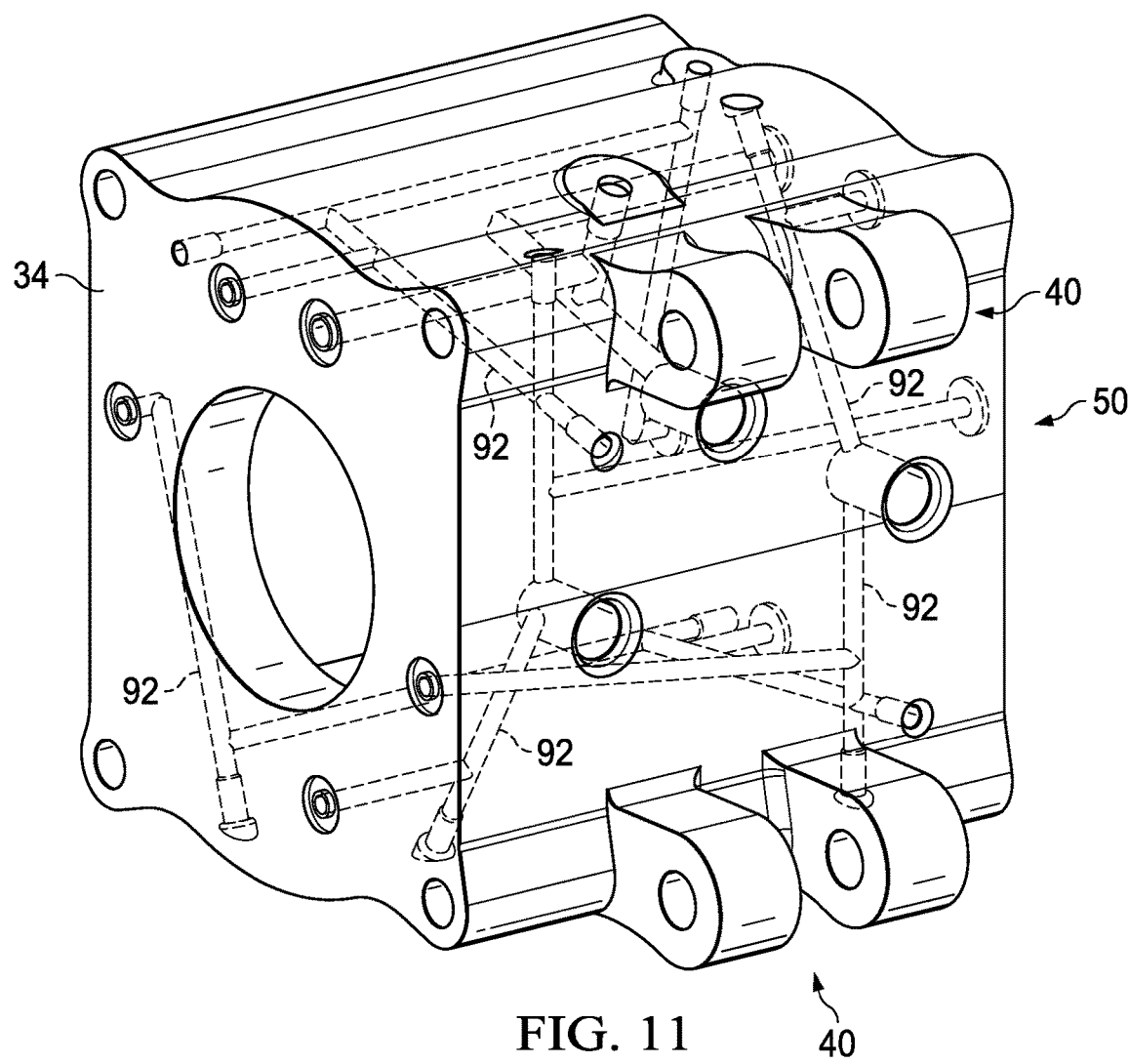
FIG. 11 depicts the manifold block of the rotary actuator of FIG. 3.

FIG. 11 depicts a manifold block 34, which is depicted a translucent in order to show a plurality of internal channels 92 within manifold block 34. Internal channels 92 are configured to deliver hydraulic fluid to at least each of the piston pressure chambers 66 formed by pressure chamber assembly 64. Typically, manifold block 34 defines a first plurality of internal channels configured to deliver hydraulic fluid to the first piston pressure chambers, and further defines a second plurality of internal channels configured to deliver hydraulic fluid to the second piston pressure chambers, such that by delivering hydraulic fluid to the first and second piston pressure chambers in turn, the first rotor shaft can be rotated and counter-rotated.

As discussed above, first rotor assembly 36 includes first actuator housing 51, first rotor shaft 46, and a plurality of crank arms 58 coupling first rotor shaft 46 to a plurality of arcuate pistons 60. The plurality of arcuate pistons 60 coupled to first rotor shaft 46 can include a first set 94 of the plurality of arcuate pistons 60 that extend in a first rotational direction around rotation axis 56, and a second set 96 of the plurality of arcuate pistons 60 that extend in a second and opposing rotational direction around rotation axis 56. Typically, the first set 94 and second set 96 of arcuate pistons are equal in number. Rotary actuator 32 can therefore be operated by delivering hydraulic fluid to a set of first piston pressure chambers corresponding to first half 94 of the arcuate pistons, increasing hydraulic pressure in the piston pressure chambers, and thereby causing each of the first half 94 of arcuate pistons 60 to be urged out of its corresponding piston pressure chamber, resulting in rotation of first rotor shaft 46 and actuation of the rotary actuator. Under the urging of the hydraulic pressure within the piston pressure chambers for the first half 94 of the arcuate pistons 60, the rotor shaft can rotate until each of the crankarms 58 of the first half 94 of the arcuate pistons meets a corresponding rotation stop 98, visible in FIG. 8.

Rotary actuator 32 can be returned to its initial configuration by relieving the hydraulic pressure applied to the first half 94 of the arcuate pistons 60, and applying hydraulic pressure to the second plurality of second piston pressure chambers for the second half 96 of the arcuate pistons 60, thereby causing a counter-rotation of the first rotor shaft 46 until the crankarms 58 of the second half 96 of the arcuate pistons, in turn, meet their corresponding rotation stops 98, and the actuator 32 is returned to its initial configuration.

Actuation of rotary actuator 32 can be primarily accomplished by the alternate pressurizing and depressurizing of the first and second plurality of piston pressure chambers, as described above. However, as the first actuator housing 51 can be sealingly coupled to manifold block 34, and actuator housing 51 fully encloses first pressure chamber assembly 64, an additional internal volume bounded by an exterior surface 100 of the first pressure chamber assembly 64, an outer surface 102 of the first rotor shaft 46, and an interior surface 104 of the first actuator housing 51 is created. This internal volume is referred to as a first return pressure volume 106.

The plurality of arcuate pistons 60 coupled to the first rotor shaft 46 can be coupled to first rotor shaft 46 in pairs. More particularly, the plurality of arcuate pistons 60 can be coupled to first rotor shaft 46 in an arrangement that exhibits twofold rotational symmetry with respect to rotation axis 56. That is, the arrangement of arcuate pistons around the first rotor shaft can be symmetrical with respect to rotation of first rotor shaft 46 by 180 degrees around rotation axis 56. This twofold rotational symmetry can be seen for example in FIGS. 6, 7, and 12.

As discussed above, rotary actuator 32 can include first rotor assembly 36 and second rotor assembly 38, each coupled to opposing sides of manifold block 34.

Figure 12:
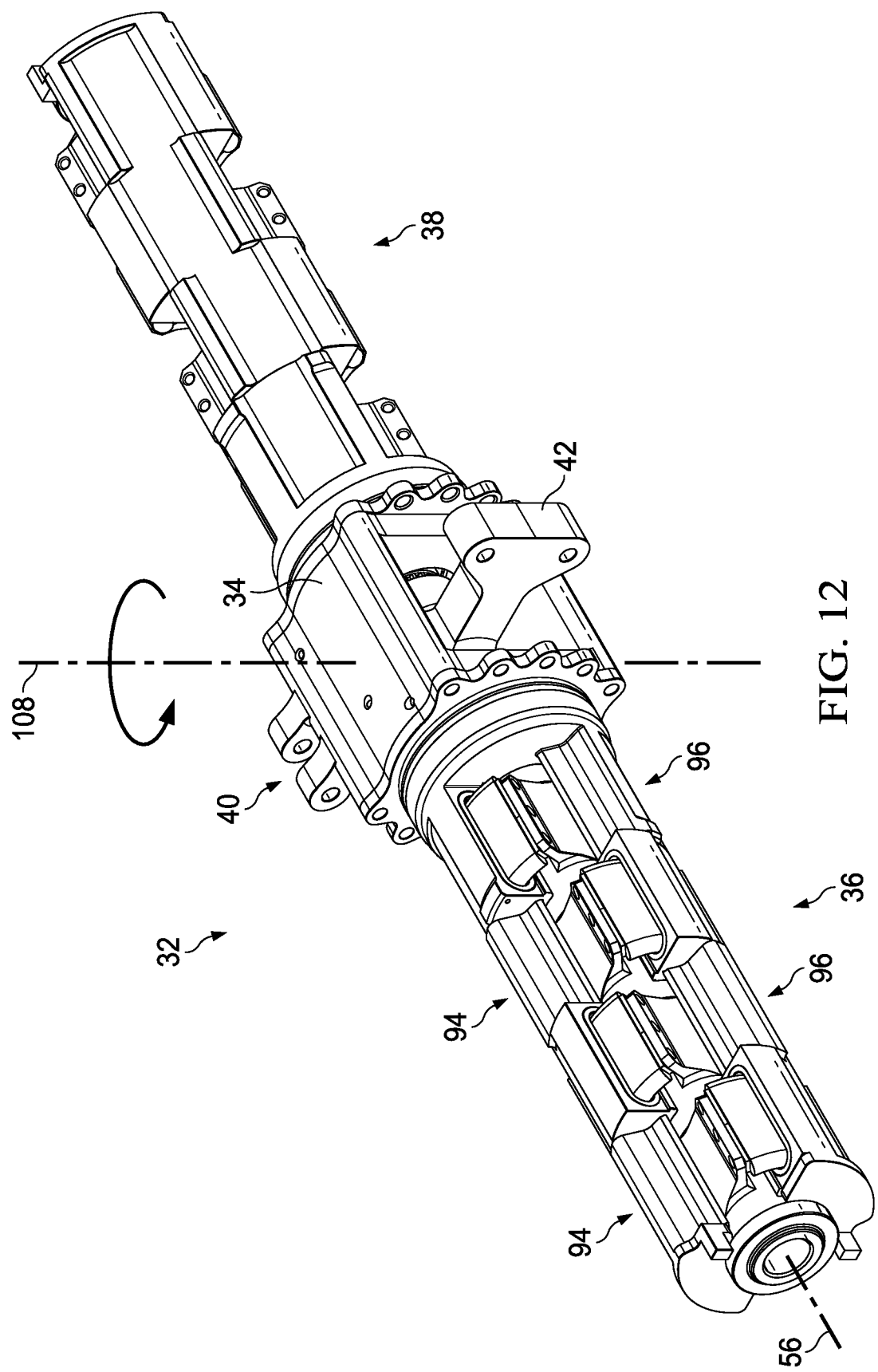
FIG. 12 depicts the rotary actuator of FIG. 3, including the first and second rotary assemblies, omitting the first actuator housing and second actuator housing.

Typically, the composition and configuration of second rotor assembly 38 is selected to be substantially identical to that of first rotor assembly 36, and is symmetrical with first rotor assembly 36 via a 180 degree rotation around a vertical symmetry axis 108 that is orthogonal to rotation axis 56, as shown by FIG. 12, which depicts rotary actuator 32 with first actuator housing 51 and second actuator housing 52 removed. Because second rotor assembly 38 is symmetrical with first rotor assembly 36, second rotor assembly 38 also includes a rotor shaft having an end that extends into recess 44 formed in manifold block 34, such that output lug 42 is coupled to inner ends 45 and 47 of first rotor shaft 46 and second rotor shaft 48, respectively.

As exemplified by rotary actuator 32 of FIG. 12, each of first rotor assembly 36 and second rotor assembly 38 can include eight arcuate pistons 60 attached to each of the first rotor shaft 46 and second rotor shaft 48, respectively. Further, the eight arcuate pistons 60 attached to each rotor shaft can include a first set of four arcuate pistons 60 extending in a first rotational direction around rotation axis 56, and a second set of four arcuate pistons 60 extending in a second and opposing rotational direction around rotation axis 56. The eight arcuate pistons 60 are additionally disposed in an arrangement that exhibits twofold rotational symmetry with respect to rotation axis 56.

Figure 13:
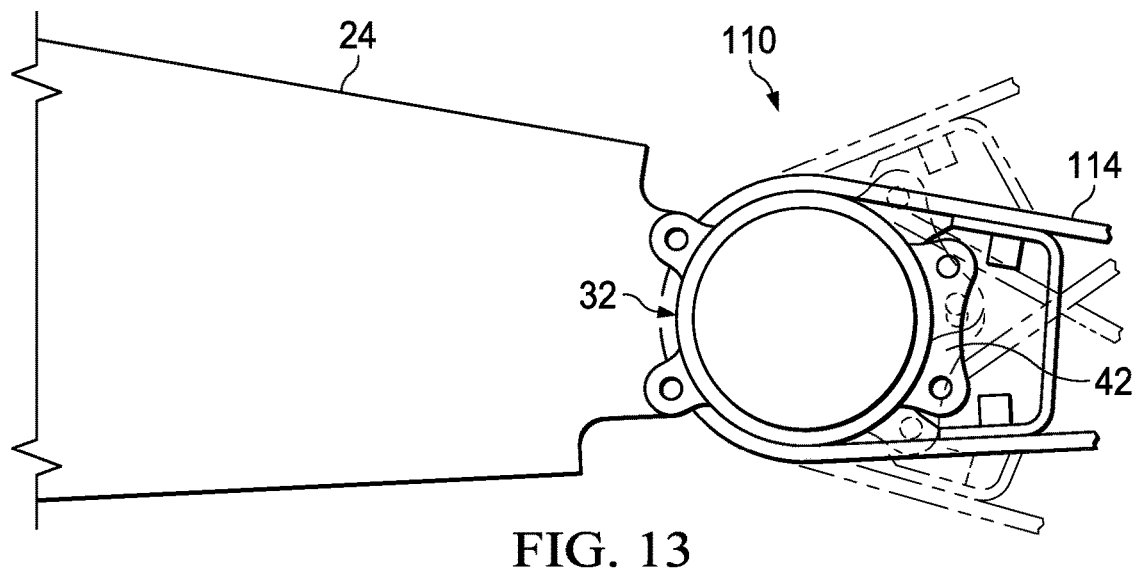
FIG. 13 is a schematic cross-section illustrating a control surface actuator system including a rotary actuator of the present disclosure coupled to a control surface at the trailing edge of a wing.

As rotary actuator 32 can be significantly smaller in volume than a corresponding conventional linear actuator, rotary actuator 32 can be advantageously incorporated into a control surface actuator system 110, as shown in FIG. 13 where rotary actuator 32 can be coupled to a control surface 114 of an aircraft 10. Control surface actuator system 110 can be configured so that operation of rotary actuator 32 actuates movement of control surface 114. Alternatively, or in addition, rotary actuator 32 can be coupled to control surface 114 via an intermediate actuator arm.

As compared to the actuator system of FIG. 2, rotary actuator 32 of control system 110 can be wholly enclosed within a wing 24 having even a very thin cross-section, as shown in FIG. 13. Control system 110 is therefore well-suited to being a control system for a wing control surface, as the disclosed rotary actuator can be mounted entirely within an internal volume of the associated wing structure.

The various components of the rotary actuators disclosed herein can be manufactured from any suitable material possessing the requisite physical properties, and in particular from any suitable material already in use for the fabrication of aircraft components. In particular, the arcuate pistons of the disclosed rotary actuator can be manufactured from a stainless steel alloy, such as 15-5PH stainless steel that meets AMS5659 specifications. The surface of the arcuate piston can be further hardened by High Velocity Oxygen Fuel (HVOF) coating including, for example, tungsten carbide cobalt. The gland of the gland seals can be manufactured from, for example, an aluminum-nickel bronze alloy that meets AMS4640 specifications.

The presently disclosed rotary actuators can be manufactured by any suitable machining method capable of providing the close tolerances required for the hydraulic systems, such as for example CNC machining. Alternatively, or in addition, as the pressure chamber assemblies in particular require precise tolerances along the extended arcuate piston pathways, it can be advantageous to employ additive manufacturing methods (i.e. 3D printing) to fabricate some or all of the components of the disclosed rotary actuators.

The rotary actuators of the present disclosure can be employed in methods of actuating an aircraft control surface, where the decreased size, enhanced performance, and increased durability of the presently disclosed rotary actuators can improve aircraft control surface actuation.

Figure 14:
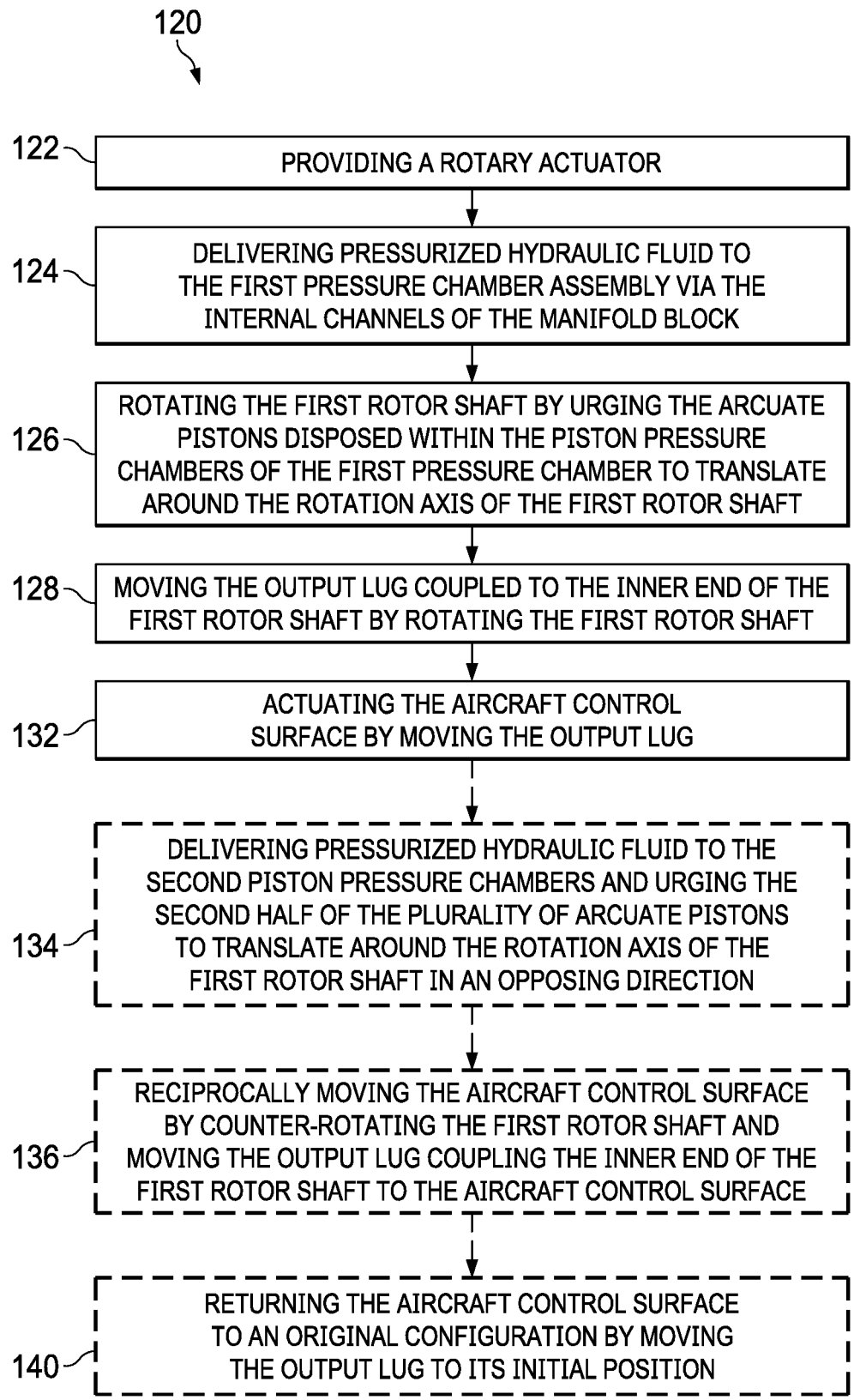
FIG. 14 is a flowchart depicting an illustrative method of actuating an aircraft control surface according to the present disclosure.

This section describes steps of an illustrative method for actuating an aircraft control surface, as shown in flowchart 120 of FIG. 14. Where appropriate, reference can be made to components and systems that can be used in carrying out each step. These references are for illustration, and are not intended to limit the possible ways of carrying out any particular step of the method.

Furthermore, based on the present disclosure it should be understood that additional steps can be performed, without departing from the spirit of the disclosure or the present claims. Although various steps of flowchart 120 are described below and depicted in FIG. 14, such steps need not necessarily all be performed, and in some cases can be performed simultaneously or in a different order than the order shown in the respective flowcharts.

The illustrative method of flowchart 120 can include providing a rotary actuator 32, as set out at step 122 of flowchart 120, and as described above. The method can further include delivering pressurized hydraulic fluid to first pressure chamber assembly 64 via internal channels 92 of manifold block 34 in order to increase hydraulic fluid pressure within the piston pressure chambers 66 of first pressure chamber assembly 64, as set out at step 124 of flowchart 120. The method can further include rotating first rotor shaft 46 by urging arcuate pistons 66 disposed within the piston pressure chambers 66 of first pressure chamber assembly 64 to translate around rotation axis 56 of first rotor shaft 46 due to the increased hydraulic fluid pressure within piston pressure chambers 66, as set out at step 126 of flowchart 120. The method can further include moving output lug 42 that is coupled to inner end 45 of first rotor shaft 46 by rotating the first rotor shaft, as set out at step 128 of flowchart 120. The method can further include moving actuator interface arm 112 by moving output lug 42, as set out at step 130 of flowchart 120. The method can further include actuating the aircraft control surface 114 by moving actuator interface arm 112, as set out at step 132 of flowchart 120.

The illustrative method of actuating an aircraft control surface can optionally further include returning the aircraft control surface to its original configuration by delivering pressurized hydraulic fluid to second plurality of piston pressure chambers 66 for second half 96 of arcuate pistons 60, thereby urging the second set of the plurality of arcuate pistons 96 to translate around rotation axis 56 of first rotor shaft 46 in an opposing direction, as set out at step 134 of flowchart 120. The method can optionally further include reciprocally moving actuator arm 112 by counter-rotating first rotor shaft 46 and moving output lug 42 coupling inner end 45 of first rotor shaft 46 to actuator arm 112, as set out at step 136 of flowchart 120. The method can optionally further include returning aircraft control surface 114 to its original configuration by moving actuator arm 114 to its initial position, as set out at step 140 of flowchart 120.

Examples, Components, and Alternatives

A. Illustrative Combinations and Additional Examples

This section describes additional aspects and features of the disclosed rotary actuators, aircraft control surface actuation systems, and methods of actuating an aircraft control surface, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A rotary actuator, comprising: a manifold block; and a first rotor assembly mounted to the manifold block; wherein the first rotor assembly includes: a first rotor shaft extending into the manifold block; a plurality of arcuate pistons attached to the first rotor shaft, each arcuate piston curving at a set radial distance from a rotation axis of the first rotor shaft, and each piston attached to the first rotor shaft via a crank arm; a first pressure chamber assembly coupled to the manifold block, the first pressure chamber defining a plurality of piston pressure chambers configured to receive and at least partially enclose each arcuate piston; a plurality of gland seals disposed adjacent an entrance to each piston pressure chamber and creating a seal between an inner surface of the piston pressure chamber and an outer surface of the arcuate piston inserted therein; wherein each gland seal includes an inner seal configured to engage a surface of the arcuate piston, and a plurality of outer seals configured to engage the inner surface of the piston pressure chamber, such that a hydraulic seal is formed between each piston pressure chamber and the arcuate piston inserted therein; the first rotor assembly being configured so that delivering a hydraulic fluid to the plurality of piston pressure chambers causes the arcuate piston disposed within each piston pressure chamber to translate at the set radial distance around the rotation axis of the first rotor shaft, thereby rotating the first rotor shaft.

A2 The rotary actuator of paragraph A1, wherein a first set of the plurality of arcuate pistons extends in a first rotational direction around the rotation axis, and a second set of the plurality of arcuate pistons extends in a second and opposing rotational direction around the rotation axis, such that delivering hydraulic fluid to the first piston pressure chambers of the first set of the arcuate pistons causes rotation of the first rotor shaft, and delivering the hydraulic fluid to the second piston pressure chambers of the second set of the arcuate pistons causes counter-rotation of the first rotor shaft.

A3. The rotary actuator of paragraph A1, further comprising an first actuator housing sealingly coupled to the manifold block and enclosing the first pressure chamber assembly such that an exterior surface of the first pressure chamber assembly, an outer surface of the first rotor shaft, and an interior surface of the first actuator housing, in combination, define a first return pressure volume.

A4. The rotary actuator of paragraph A1, wherein an inner end of the first rotor shaft extends into a recess formed in the manifold block; further comprising an output lug coupled to the inner end of the first rotor shaft, where the output lug is configured to be coupled to a control surface.

A5. The rotary actuator of paragraph A1, wherein the plurality of arcuate pistons are coupled to the first rotor shaft in pairs in an arrangement having twofold rotational symmetry around the rotation axis.

A6. The rotary actuator of paragraph A1, wherein each gland seal is disposed within a gland bore formed in the interior surface of the corresponding piston pressure chamber.

A7. The rotary actuator of paragraph A6, wherein each gland seal includes a gland that is retained within the gland bore by a shear wire disposed between the gland and the gland bore that engages both the gland and the gland bore.

A8. The rotary actuator of paragraph A6, wherein the inner seal includes a rod seal.

A9 The rotary actuator of paragraph A6, wherein the plurality of outer seals include a plurality of O-ring seals.

A10. The rotary actuator of paragraph A1, wherein the manifold block defines a plurality of internal channels configured to deliver hydraulic fluid to the piston pressure chambers.

A11. The rotary actuator of paragraph A10, wherein the manifold block defines a first plurality of internal channels configured to deliver hydraulic fluid to the first piston pressure chambers, and further defines a second plurality of internal channels configured to deliver hydraulic fluid to the second piston pressure chambers, such that by delivering hydraulic fluid to the first and second piston pressure chambers in turn, the first rotor shaft can be rotated and counter-rotated.

A12. The rotary actuator of paragraph A1, further comprising a second rotor assembly mounted to the manifold block on a side opposing the first rotor assembly; wherein the second rotor assembly is substantially symmetric with the first rotor assembly with respect to rotation around a vertical axis orthogonal to the rotation axis; and an inner end of a second rotor shaft of the second rotor assembly extends into a recess formed in the manifold block; further comprising an output lug that is coupled to the inner ends of both the first rotor shaft and the second rotor shaft, where the output lug is configured to be coupled to a control surface.

A13. The rotary actuator of paragraph A12, wherein each of the first and second rotor assemblies includes 8 arcuate pistons attached to its respective rotor shaft; wherein each of the first and second rotor assemblies includes a first set of four arcuate pistons extending in a first rotational direction around the rotation axis, and a second set of four arcuate pistons extending in a second and opposing rotational direction around the rotation axis; such that delivering hydraulic fluid to the first piston pressure chambers of the first set of four arcuate pistons for each of the first and second rotor assemblies causes rotation of the combined first and second rotor shafts, and delivering the hydraulic fluid to the second piston pressure chambers of the second set of four arcuate pistons for each of the first and second rotor assemblies causes counter-rotation of the combined first and second rotor shafts.

B1. A control surface actuator system, comprising: a control surface of an aircraft; a rotary actuator that is coupled to the control surface, such that operation of the rotary actuator actuates a movement of the control surface; wherein the rotary actuator includes: a manifold block; and a first and a second rotor assembly mounted to opposing sides of the manifold block along a rotation axis; wherein each of the first and second rotor assemblies includes a rotor shaft extending into the manifold block along the rotation axis; a plurality of arcuate pistons attached to the rotor shaft, each piston curving along a defined radial distance from a rotation axis of the rotor shaft, and each piston attached to the rotor shaft via an intermediate crank arm; a pressure chamber assembly coupled to the manifold block, the pressure chamber defining a plurality of piston pressure chambers configured to receive and at least partially enclose the plurality of arcuate pistons; a plurality of gland seals disposed adjacent an entrance to each piston pressure chamber and creating a seal between an inner surface of the piston pressure chamber and the arcuate piston disposed therein; wherein each gland seal includes an inner seal configured to engage the arcuate piston, and a plurality of outer seals configured to engage the inner surface of the piston pressure chamber, such that a hydraulic seal is formed between each piston pressure chamber and the arcuate piston inserted therein; and each rotor assembly being configured so that delivering hydraulic fluid to the plurality of piston pressure chambers causes the arcuate piston disposed within each piston pressure chamber to translate around the rotation axis, increasing a piston pressure chamber volume and thereby rotating the coupled rotor shaft.

B2. The control surface actuator system of paragraph B1, wherein the control surface is one of a wing aileron, an elevator, a rudder, a spoiler, a wing flap, a wing slat, an air brake, a control horn, or a trim tab.

B3. The control surface actuator system of paragraph B1, wherein the rotary actuator is disposed entirely within an aircraft wing.

C1. A method of actuating an aircraft control surface, wherein the aircraft control surface is coupled to an actuator arm; comprising: providing a rotary actuator, the rotary actuator including: a manifold block; and a first rotor assembly mounted to the manifold block; wherein the first rotor assembly includes: a first rotor shaft extending into the manifold block; a plurality of arcuate pistons attached to the rotor shaft, each piston curving along a defined radial distance from a rotation axis of the rotor shaft, and each piston attached to the rotor shaft via an intermediate crank arm; a first pressure chamber assembly coupled to the manifold block, the first pressure chamber defining a plurality of piston pressure chambers configured to receive and at least partially enclose the plurality of arcuate pistons; wherein the manifold block defines a plurality of internal channels to deliver hydraulic fluid to the piston pressure chambers; a plurality of gland seals disposed adjacent an entrance to each piston pressure chamber and creating a seal between an inner surface of the piston pressure chamber and the arcuate piston disposed therein; wherein each gland seal includes an inner seal configured to engage a surface of the arcuate piston, and a plurality of outer seals configured to engage the inner surface of the piston pressure chamber, such that a hydraulic seal is formed between each piston pressure chamber and the arcuate piston inserted therein; wherein the first rotor assembly is configured so that delivering hydraulic fluid to the plurality of piston pressure chambers via the plurality of internal channels of the manifold block causes the arcuate piston disposed within each piston pressure chamber to translate around the rotation axis of the first rotor shaft, thereby rotating the first rotor shaft; and an inner end of the first rotor shaft extends into a recess formed in the manifold block, with an output lug coupling the inner end of the first rotor shaft to an end of the actuator arm that is also coupled to the aircraft control surface; delivering pressurized hydraulic fluid to the first pressure chamber assembly via the internal channels of the manifold block to increase hydraulic fluid pressure within the piston pressure chambers of the first pressure chamber assembly; rotating the first rotor shaft by urging the arcuate pistons disposed within the piston pressure chambers of the first pressure chamber assembly to translate around the rotation axis of the first rotor shaft due to the increased hydraulic fluid pressure within the piston pressure chambers; moving the output lug coupled to the inner end of the first rotor shaft by rotating the first rotor shaft; moving the actuator arm by moving the output lug; and actuating the aircraft control surface by moving the actuator arm.

C2. The method of paragraph C1, wherein a first set of the plurality of arcuate pistons extends in a first rotational direction around the rotation axis, and a second set of the plurality of arcuate pistons extends in a second and opposing rotational direction around the rotation axis; and the manifold block defines a second plurality of internal channels configured to deliver hydraulic fluid to the second piston pressure chambers; further comprising: delivering pressurized hydraulic fluid to the second piston pressure chambers, and urging the second set of the plurality of arcuate pistons to translate around the rotation axis of the first rotor shaft in an opposing direction, and causing the first set of the plurality of arcuate pistons disposed within the first piston pressure chambers to translate reciprocally around the rotation axis of the first rotor shaft, thereby counter-rotating the first rotor shaft; reciprocally moving the actuator arm by counter-rotating the first rotor shaft and moving the output lug coupling the inner end of the first rotor shaft to the actuator arm; and returning the aircraft control surface to an original configuration by moving the actuator arm to its initial position.

C3. The method of paragraph C1, wherein providing the rotary actuator includes providing a second rotor assembly mounted to the manifold block on a side opposing the first rotor assembly, the second rotor assembly being substantially mirror-symmetric to the first rotor assembly with respect to a plane bisecting the manifold block orthogonal to the rotation axis, and an inner end of a second rotor shaft of the second rotor assembly extending into the recess formed in the manifold block, and where the output lug is additionally coupled to the inner end of the second rotor shaft.

C4. The method of paragraph C3, wherein providing the rotary actuator includes providing first and second rotor assemblies that each include 8 arcuate pistons attached to each of the first and second rotor shafts.

C5. The method of paragraph C4, wherein providing the rotary actuator includes providing first and second rotor assemblies that each include 8 arcuate pistons attached to each of the first and second rotor shafts, wherein each of the first and second rotor assemblies includes a first set of four arcuate pistons extending in a first rotational direction around the rotation axis, and a second set of four arcuate pistons extending in a second and opposing rotational direction around the rotation axis, in an arrangement having twofold rotational symmetry around the rotation axis.

C6. The method of paragraph C1, wherein the aircraft control surface is a wing control surface, and providing the rotary actuator includes mounting the rotary actuator entirely within an internal volume of a wing structure.

Advantages, Features, and Benefits

The rotary actuators disclosed herein, including control surface actuator systems including the rotary actuators, and methods of actuating a control surface that include the operation of the rotary actuators, provide significant benefits when compared to prior linear actuator designs for the actuation of aircraft control surfaces.

The disclosed rotary actuators are configured to create rotational motion directly, as opposed to linear actuators which must mechanically transform a generated linear motion into a rotational motion that may not be compatible with the limits of the available operational volume As wing thickness decreases, the volume available for a control surface actuator system that includes a linear actuator becomes limited. At least a portion of the linear actuator can be forced to protrude outside the wing interior, requiring a blister or fairing to enclose the protrusion, and resulting in decreased aerodynamics. As the rotary actuator described herein requires a smaller operational volume, it can be incorporated entirely within even relatively thin wing structures. Additionally, as the actuator assembly can be positioned nearer the trailing edge of the wing, a greater volume of the wing interior can be used for fuel capacity.

As rotational motion is generated directly by the rotary actuator, a coupling to the horn arm to provide leverage to operate a control surface is no longer needed, and the control surface can be actuated directly. Furthermore, the rotary actuator exhibits greater mechanical reliability than a conventional toggle link actuator sized for the same application. The toggle link actuator design requires that the bearings used be sized larger than the rotary actuator so as to compensate for the non-linear loads being applied by the actuator. The rotary actuators described herein create significantly reduced bearing loads, resulting in less bearing wear, and greater actuator reliability.

A toggle link actuator must also be mounted to a spar, and requires structural stiffeners in order to provide sufficient stability for the actuator to withstand the loads applied to the actuator during operation. In contrast, installation of the rotary actuator does not require additional stiffeners, resulting in a lighter airframe. Additionally, the rotary actuator is less susceptible to buckling loads, due to its compact design.

The presently described rotary actuators are substantially improved over previous versions of rotary actuators, in that the disclosed gland seals provide robust hydraulic operation without the high prevalence of hydraulic leaks observed in prior systems, resulting in the rotary actuator requiring less maintenance and having an extended operational lifetime, relative to previous rotary actuators.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A rotary actuator, comprising:
a manifold block; and
a first rotor assembly mounted to the manifold block;
wherein the first rotor assembly includes:
   a first rotor shaft extending into the manifold block;
   a plurality of arcuate pistons attached to the first rotor shaft, each arcuate piston curving at a set radial distance from a rotation axis of the first rotor shaft, and each piston attached to the first rotor shaft via a crank arm;
   a first pressure chamber assembly coupled to the manifold block, the first pressure chamber assembly defining a plurality of piston pressure chambers each configured to receive and at least partially enclose a corresponding arcuate piston;

a plurality of gland seals disposed adjacent an entrance to each piston pressure chamber and creating a seal between an inner surface of the piston pressure chamber and an outer surface of the corresponding arcuate piston inserted therein;

wherein each gland seal includes an inner seal configured to engage a surface of the arcuate piston, and a plurality of outer seals configured to engage the inner surface of the piston pressure chamber, such that a hydraulic seal is formed between each piston pressure chamber and the corresponding arcuate piston inserted therein, wherein each gland seal is disposed within a gland bore formed in the inner surface of its corresponding piston pressure chamber, and wherein each gland seal includes a gland that is retained within the gland bore by a shear wire disposed between the gland and the gland bore that engages both the gland and the gland bore;

the first rotor assembly being configured so that delivering a hydraulic fluid to the plurality of piston pressure chambers causes the arcuate piston disposed within each piston pressure chamber to translate at the set radial distance around the rotation axis of the first rotor shaft, thereby rotating the first rotor shaft.

2. The rotary actuator of claim 1, wherein the plurality of arcuate pistons includes a first set of the plurality of arcuate pistons extending in a first rotational direction around the rotation axis, and a second set of the plurality of arcuate pistons extending in a second and opposing rotational direction around the rotation axis, such that delivering hydraulic fluid to a plurality of first piston pressure chambers for the first set of the arcuate pistons causes rotation of the first rotor shaft, and delivering the hydraulic fluid to a second plurality of second piston pressure chambers of the second set of the arcuate pistons causes counter-rotation of the first rotor shaft.

3. The rotary actuator of claim 2, wherein the manifold block defines a first plurality of internal channels configured to deliver hydraulic fluid to the first piston pressure chambers, and further defines a second plurality of internal channels configured to deliver hydraulic fluid to the second piston pressure chambers, such that by delivering hydraulic fluid to the first and second piston pressure chambers in turn, the first rotor shaft can be rotated and counter-rotated.

4. The rotary actuator of claim 2, further comprising a second rotor assembly mounted to the manifold block on a side opposing the first rotor assembly;

wherein the second rotor assembly is symmetric with the first rotor assembly with respect to rotation around a vertical axis orthogonal to the rotation axis; and an inner end of a second rotor shaft of the second rotor assembly extends into a recess formed in the manifold block;

further comprising an output lug that is coupled to the inner ends of both the first rotor shaft and the second rotor shaft, where the output lug is configured to be coupled to a control surface.

5. The rotary actuator of claim 4, wherein each of the first and second rotor assemblies includes 8 arcuate pistons attached to its respective rotor shaft;

wherein each of the first and second rotor assemblies includes a first set of four arcuate pistons extending in a first rotational direction around the rotation axis, and a second set of four arcuate pistons extending in a second and opposing rotational direction around the rotation axis;

such that delivering hydraulic fluid to the first piston pressure chambers of the first set of four arcuate pistons for each of the first and second rotor assemblies causes rotation of the combined first and second rotor shafts, and delivering the hydraulic fluid to the second piston pressure chambers of the second set of four arcuate pistons for each of the first and second rotor assemblies causes counter-rotation of the combined first and second rotor shafts.

6. The rotary actuator of claim 1, further comprising an first actuator housing sealingly coupled to the manifold block and enclosing the first pressure chamber assembly such that an exterior surface of the first pressure chamber assembly, an outer surface of the first rotor shaft, and an interior surface of the first actuator housing, in combination, define a first return pressure volume.

7. The rotary actuator of claim 1, wherein an inner end of the first rotor shaft extends into a recess formed in the manifold block; further comprising an output lug coupled to the inner end of the first rotor shaft, where the output lug is configured to be coupled to a control surface.

8. The rotary actuator of claim 1, wherein the plurality of arcuate pistons are coupled to the first rotor shaft in pairs in an arrangement having twofold rotational symmetry around the rotation axis.

9. The rotary actuator of claim 1, wherein the inner seal includes a rod seal.

10. The rotary actuator of claim 1, wherein the plurality of outer seals include a plurality of O-ring seals.

11. The rotary actuator of claim 1, wherein the manifold block defines a plurality of internal channels configured to deliver hydraulic fluid to the piston pressure chambers.

12. A control surface actuator system, comprising:
a control surface of an aircraft;
a rotary actuator that is coupled to the control surface, such that operation of the rotary actuator actuates a movement of the control surface;
wherein the rotary actuator includes:
a manifold block; and
a first and a second rotor assembly mounted to opposing sides of the manifold block along a rotation axis;
wherein each of the first and second rotor assemblies includes
a rotor shaft extending into the manifold block along the rotation axis;
a plurality of arcuate pistons attached to the rotor shaft, each piston curving along a defined radial distance from a rotation axis of the rotor shaft, and each piston attached to the rotor shaft via an intermediate crank arm;
a pressure chamber assembly coupled to the manifold block, the pressure chamber assembly defining a plurality of piston pressure chambers configured to receive and at least partially enclose the plurality of arcuate pistons;
a plurality of gland seals disposed adjacent an entrance to each piston pressure chamber and creating a hydraulic seal between an inner surface of the piston pressure chamber and an outer surface of the arcuate piston disposed therein; and
each rotor assembly being configured so that delivering hydraulic fluid to the plurality of piston pressure chambers causes the arcuate piston disposed within each piston pressure chamber to translate around the rotation axis, increasing a piston pressure chamber volume and thereby rotating the coupled rotor shaft.

13. The control surface actuator system of claim 12, wherein the control surface is one of a wing aileron, an elevator, a rudder, a spoiler, a wing flap, a wing slat, an air brake, a control horn, or a trim tab.

14. The control surface actuator system of claim 12, wherein the rotary actuator is disposed entirely within an aircraft wing.

15. A method of actuating an aircraft control surface, comprising: providing a rotary actuator, the rotary actuator including:
  a manifold block;
  a first rotor assembly mounted to the manifold block; and
  a second rotor assembly mounted to the manifold block on a side opposing the first rotor assembly;
  wherein the first rotor assembly includes:
    a first rotor shaft extending into the manifold block;
    a plurality of arcuate pistons attached to the first rotor shaft, each piston curving along a defined radial distance from a rotation axis of the rotor shaft, and each piston attached to the first rotor shaft via an intermediate crank arm;
    a first pressure chamber assembly coupled to the manifold block, the first pressure chamber defining a plurality of piston pressure chambers configured to receive and at least partially enclose the plurality of arcuate pistons; wherein the manifold block defines a plurality of internal channels to deliver hydraulic fluid to the piston pressure chambers;
    a plurality of gland seals disposed adjacent an entrance to each piston pressure chamber and creating a seal between an inner surface of the piston pressure chamber and the arcuate piston disposed therein;
      wherein each gland seal includes an inner seal configured to engage a surface of the arcuate piston, and a plurality of outer seals configured to engage the inner surface of the piston pressure chamber, such that a hydraulic seal is formed between each piston pressure chamber and the arcuate piston inserted therein;
    wherein the first rotor assembly is configured so that delivering hydraulic fluid to the plurality of piston pressure chambers via the plurality of internal channels of the manifold block causes the arcuate piston disposed within each piston pressure chamber to translate around the rotation axis of the first rotor shaft, thereby rotating the first rotor shaft; and
    an inner end of the first rotor shaft extends into a recess formed in the manifold block, with an output lug coupling the inner end of the first rotor shaft to the aircraft control surface; and
  wherein the second rotor assembly is mirror-symmetric to the first rotor assembly with respect to a plane bisecting the manifold block orthogonal to the rotation axis, wherein an inner end of a second rotor shaft of the second rotor assembly extends into the recess formed in the manifold block, and wherein the output lug is additionally coupled to the inner end of the second rotor shaft;
  delivering pressurized hydraulic fluid to the first pressure chamber assembly via the internal channels of the manifold block to increase hydraulic fluid pressure within the piston pressure chambers of the first pressure chamber assembly;
  rotating the first rotor shaft by urging the arcuate pistons disposed within the piston pressure chambers of the first pressure chamber assembly to translate around the rotation axis of the first rotor shaft due to the increased hydraulic fluid pressure within the piston pressure chambers;
  moving the output lug coupled to the inner end of the first rotor shaft by rotating the first rotor shaft; and
  actuating the aircraft control surface by moving the output lug.

16. The method of claim 15, wherein a first set of the plurality of arcuate pistons extends in a first rotational direction around the rotation axis, and a second set of the plurality of arcuate pistons extends in a second and opposing rotational direction around the rotation axis; and the manifold block defines a second plurality of internal channels configured to deliver hydraulic fluid to a second plurality of piston pressure chambers;
further comprising:
  delivering pressurized hydraulic fluid to the plurality of second piston pressure chambers, and urging the second set of the plurality of arcuate pistons to translate around the rotation axis of the first rotor shaft in an opposing direction, and causing the first set of the plurality of arcuate pistons disposed within the first piston pressure chambers to translate reciprocally around the rotation axis of the first rotor shaft, thereby counter-rotating the first rotor shaft;
  reciprocally moving the control surface by counter-rotating the first rotor shaft and thereby moving the output lug coupling the inner end of the first rotor shaft to the control surface; and
  returning the aircraft control surface to an original configuration by moving the output lug to its initial position.

17. The method of claim 15, wherein providing the rotary actuator includes providing first and second rotor assemblies that each include 8 arcuate pistons attached to each of the first and second rotor shafts.

18. The method of claim 17, wherein providing the rotary actuator includes providing first and second rotor assemblies that each include 8 arcuate pistons attached to each of the first and second rotor shafts, wherein each of the first and second rotor assemblies includes a first set of four arcuate pistons extending in a first rotational direction around the rotation axis, and a second set of four arcuate pistons extending in a second and opposing rotational direction around the rotation axis, in an arrangement having twofold rotational symmetry around the rotation axis.

19. The method of claim 15, wherein the aircraft control surface is a wing control surface, and providing the rotary actuator includes mounting the rotary actuator entirely within an internal volume of a wing structure.

20. A rotary actuator, comprising:
  a manifold block; and
  a first rotor assembly mounted to the manifold block;
  wherein the first rotor assembly includes:
    a first rotor shaft extending into the manifold block;
    a plurality of arcuate pistons attached to the first rotor shaft, each arcuate piston curving at a set radial distance from a rotation axis of the first rotor shaft, and each piston attached to the first rotor shaft via a crank arm;
    a first pressure chamber assembly coupled to the manifold block, the first pressure chamber assembly defining a plurality of piston pressure chambers each configured to receive and at least partially enclose a corresponding arcuate piston;

a plurality of gland seals disposed adjacent an entrance to each piston pressure chamber and creating a seal between an inner surface of the piston pressure chamber and an outer surface of the corresponding arcuate piston inserted therein;

wherein each gland seal includes an inner seal configured to engage a surface of the arcuate piston, and a plurality of outer seals configured to engage the inner surface of the piston pressure chamber, such that a hydraulic seal is formed between each piston pressure chamber and the corresponding arcuate piston inserted therein, wherein each gland seal is disposed within a gland bore formed in the inner surface of its corresponding piston pressure chamber, and wherein the inner seal includes a rod seal;

the first rotor assembly being configured so that delivering a hydraulic fluid to the plurality of piston pressure chambers causes the arcuate piston disposed within each piston pressure chamber to translate at the set radial distance around the rotation axis of the first rotor shaft, thereby rotating the first rotor shaft.

21. A rotary actuator, comprising:
a manifold block;
a first rotor assembly mounted to the manifold block; and
a second rotor assembly mounted to the manifold block on a side opposing the first rotor assembly;
wherein the first rotor assembly includes:
  a first rotor shaft extending into the manifold block and defining a rotation axis;
  a plurality of arcuate pistons attached to the first rotor shaft, each arcuate piston curving at a set radial distance from a rotation axis of the first rotor shaft, and each piston attached to the first rotor shaft via a crank arm;
  a first pressure chamber assembly coupled to the manifold block, the first pressure chamber assembly defining a plurality of piston pressure chambers each configured to receive and at least partially enclose a corresponding arcuate piston;
  a plurality of gland seals disposed adjacent an entrance to each piston pressure chamber and creating a seal between an inner surface of the piston pressure chamber and an outer surface of the corresponding arcuate piston inserted therein;
    wherein each gland seal includes an inner seal configured to engage a surface of the arcuate piston, and a plurality of outer seals configured to engage the inner surface of the piston pressure chamber, such that a hydraulic seal is formed between each piston pressure chamber and the corresponding arcuate piston inserted therein;
  the first rotor assembly being configured so that delivering a hydraulic fluid to the plurality of piston pressure chambers causes the arcuate piston disposed within each piston pressure chamber to translate at the set radial distance around the rotation axis of the first rotor shaft, thereby rotating the first rotor shaft;
wherein the plurality of arcuate pistons includes a first set of the plurality of arcuate pistons extending in a first rotational direction around the rotation axis, and a second set of the plurality of arcuate pistons extending in a second and opposing rotational direction around the rotation axis, such that delivering hydraulic fluid to a plurality of first piston pressure chambers for the first set of the arcuate pistons causes rotation of the first rotor shaft, and delivering the hydraulic fluid to a second plurality of second piston pressure chambers of the second set of the arcuate pistons causes counter-rotation of the first rotor shaft;
wherein the second rotor assembly is symmetric with the first rotor assembly with respect to rotation around a vertical axis orthogonal to the rotation axis, an inner end of a second rotor shaft of the second rotor assembly extends into a recess formed in the manifold block; and
further comprising an output lug that is coupled to the inner ends of both the first rotor shaft and the second rotor shaft, wherein the output lug is configured to be coupled to a control surface.

\* \* \* \* \*